Figure 1:
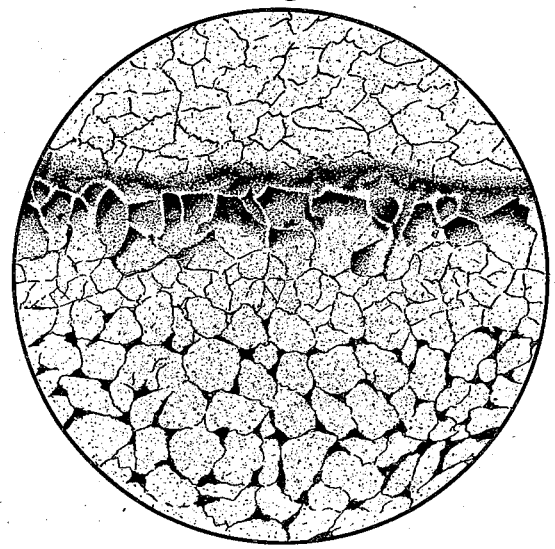

April 9, 1935. P. A. E. ARMSTRONG 1,997,538

METHOD OF WELDING ALLOY STEELS AND PRODUCT THEREOF

Filed Nov. 27, 1934

Percy A. E. Armstrong
INVENTOR

BY
Prindle, Bean & Mann
ATTORNEYS

Patented Apr. 9, 1935

1,997,538

UNITED STATES PATENT OFFICE 1,997,538

METHOD OF WELDING ALLOY STEELS AND PRODUCT THEREOF

Percy A. E. Armstrong, Beverly Hills, Calif.

Application November 27, 1934, Serial No. 754,975

17 Claims. (Cl. 29—188)

This invention relates to the production of composite metal bodies, particularly bodies of the type having one portion composed of a high melting point metal (which term is intended to include alloys) which is difficult to weld and a backing portion of steel or iron or a ferrous alloy or related metal. It particularly is useful in connection with the preparation of composite bodies having a facing portion of a corrosion resistant steel such as chromium steel (or the high carbon steels or a so-called alloy steel such for example as a high speed steel) with a backing which ordinarily will be of mild steel or of a steel of different physical characteristics from the facing portion. The invention may also in some circumstances be used for uniting different metals, as for example, for uniting nickel with steel. This application is a continuation in part of my earlier application, Ser. No. 699,397, filed Nov. 23, 1933.

Metals of the type that are difficult to weld have the characteristic that on exposure to the air they immediately form a thin nonmetallic surface film which is ordinarily considered to be an oxide, and this film is present even though the metal appears to be clean and bright and renders it difficult to weld to another metal. The exact nature of the films which interfere with welding is sometimes exceedingly difficult to determine, and it may be that in some cases they contain elements other than oxygen, but nevertheless I intend to include films of this general nature when I refer to oxide films.

Broadly speaking, my invention comprises the step of utilizing a layer of electrolytic iron as a bonding medium between the two members to be welded. This electrolytic iron is to be deposited on one member and when so deposited ordinarily will readily weld to the other member. However, the first and primary requirement is that the electrolytically deposited layer of iron must form a good bond with the metal body on which it is deposited. This can be accomplished by preparing the face of the mass of metal to be coated in such a way that its surface is free from interfering film and then depositing the overlying layer of iron while this condition is maintained. If desired, a thin film of other metal may be interposed between the mass of metal and the overlying layer of iron and such film may under some circumstances tend to prevent the migration of carbon. However, such an intervening film often will be found to be of more detriment than benefit and I do not recommend it for general applications. If such a film is to be used it may be made, for example, of silver, copper, nickel or cobalt. If both of the members to be combined are of the type that is difficult to weld, then each should have a surface overlaid with electrolytic iron.

With stainless steels the principal use of my process will be found in the production of sheets, plates or bars having an iron or steel backing to which is attached a veneer face of the stainless steel. Many efforts have previously been made to produce such a product but these have not been entirely successful, and it is my belief that the difficulties heretofore encountered are due to the presence of the interfering film above referred to, for I believe that no weld can take place at the points where such a film exists. It is true that some weld can be obtained by hot working the stainless steel in close proximity to an iron backing, for in that case the film layer will be ruptured at various points so that a true metal-to-metal contact will be obtained and welds of variable quality will be had at the points of contact, but with such material there are always areas of weakness and the danger of the two layers separating.

When the welding of the two bodies of metal is conducted in accordance with my invention using the properly applied intervening layer of electrolytic iron, the danger of separation is eliminated, for as previously stated the electrolytic iron will readily weld and diffuse with the usual types of backing metal employed; and if it is properly applied I have found that the electrolytic iron not only will form a close bond with the underbody but further, when the underbody with its cover of iron is heated (either for this express purpose or as an incident to welding), a very extraordinary type of diffusion weld will be formed between the electrolytic iron and the underbody so that a separation of the electrolytic iron from the member onto which it is deposited becomes totally impossible and the final weld between the two main bodies of metal is exceedingly strong. The strength of this weld will continue to be improved by any subsequent heat treatment, such as annealing or heating for hot working, as this will tend to increase the diffusion of the electrolytic iron and thereby tend still further to homogenize the bond area.

In carrying out my process I have found one way of cleaning the face of the metal so that the electrolytic deposit may be made on an oxide-free surface is to first clean the face of the metal with sand blasting and pickling and then immersing such face into the plating bath while still wet with the pickling acid. Detailed methods of doing this are described in the accompanying examples.

The plated film may be very thin; in fact, for many purposes nothing more is needed than sufficient to give substantial coverage. I do not mean to limit myself to very thin plated films, for of course if desired a thicker coating may be applied. But even in the case where iron is applied electrolytically either alone or over silver, copper, nickel or cobalt, there is no corresponding advantage for the purpose of this invention in thickening the iron deposit beyond the point where it adjusts itself to varying heights on the surface and supplies a sufficient thickness to form a grading zone to prevent cracking at the weld perhaps due to varying coefficients of expansion. Ordinarily the iron film will be so thin that when it is welded to an iron backing either by pressure welding at relatively high temperatures or by casting, it will substantially lose its identity in the finished product and will homogenize with the rest of the iron backing and form a remarkable diffusion weld with the alloy face. Thus an ordinary microscopic examination of an etched section of a properly made weld between a stainless steel facing material and an iron backing where an intermediate iron film was electroplated on the stainless steel, will appear only as a two-layer material. The electro-deposited iron will merge into the backing and there will be a graded diffusion zone (which usually can be seen after being developed with acid etching) between the stainless steel and the backing, which diffusion may gradually merge into the backing material. However, it is possible by my process under some circumstances to obtain a strong weld between the electrolytically deposited iron and the backing material of mild steel at such low temperatures (2100° F. or lower) that no appreciable carbon migration will take place. In such case, the iron and steel may be firmly united together mechanically while a microscopic examination might show a difference in crystal structure due to the different carbon content. Where silver, copper, nickel or cobalt is employed in the form of a thin film, the final product will have the characteristics of a three-layer material and ordinarily this will not be greatly altered by the thin film of iron deposited electrolytically over the intervening metal.

Where the backing material used is not in itself a readily weldable alloy it may likewise be electroplated with iron, as I have found that the electro-deposited iron will weld readily at comparatively low temperatures (in the order of 2100° F. or lower) and this ability to form a weld under these conditions is particularly important in the case of the high speed steels and other high carbon products.

In the case where composite sheets, plates or bars are made it is expected that the assembled products will be hot worked as by rolling or forging to change their shape so that in all cases it is intended that the material shall be heated up to about at least 2000° F. to effect the weld. This temperature is more than sufficient to cause a diffusion between the electro-deposited metal and the facing to which it is applied and the bond obtained at this point is so close that there is no danger at all of separation along this line and the true welding problem resolves itself into the welding of metals which are recognized as welding easily. This invention can readily be understood from the following examples:

Example 1.—Two plates of stainless steel containing approximately 18% chromium and 8% nickel and measuring 36 inches wide by 60 inches long by ⅜-inch thick were sand blasted so that the surfaces on both sides were practically smooth and flat. One side of each sheet was sprayed with a paint made of finely divided talc mixed with a dilute solution of sodium silicate as a binder. After the sprayed surfaces were dried the sheets were put together with the two sprayed surfaces in contact and the edges of the plates were autogenously welded together so as to make a strong water-tight joint. The plates thus prepared were given a thorough preliminary alkali or solvent cleaning to remove every trace of grease. This was followed by a thorough rinsing.

The rinsed plates were then placed in a hydrochloric acid solution having a strength of between 35% to 37% HCl; and allowed to remain there until bubbles began to come freely from every part, and this preliminary pickling was continued for five or six minutes after this phenomenon was observed, so as to insure complete removal of the surface film. The plates were then removed from the hydrochloric acid and brushed and were placed in a similar hydrochloric acid solution until about 15 seconds after bubbling had again commenced which insured the removal of any oxide or film that had formed during the brushing. The plates while still wet with the hydrochloric acid solution (which effectually prevents surface oxidation) were then placed immediately in the iron plating bath.

The plating bath used was of the chloride type and was made up of 40 ounces of ferrous chloride ($FeCl_2.4H_2O$) plus 30 ounces of calcium chloride to the gallon. Also there was included in the bath just sufficient hydrochloric acid to prevent the solution from becoming cloudy due to the formation of precipitates. This bath was at a temperature of between 195° and 205° F. and the plating was conducted using relatively pure iron anodes and a current density of 60 amperes per square foot area, the voltage varying between .6 and 1.0 volts; the voltage is not critical.

The plating was continued for about two hours and it was found that the deposit was a dense, strongly adhering film of pure iron about .006 inch thick and free from intervening oxide or film.

The assembly was now removed from the plating bath and washed, and dried rapidly to prevent the surface of the electrolytic iron from oxidizing.

To backing plates of low carbon steel were prepared each having one dry surface cleaned by fresh pickling in hydrochloric acid. These cleaned surfaces were laid upon the freshly plated surface of the assembly above described and the whole clamped and welded together but small pin hole-like vents were left so that the occluded hydrogen in the electroplated deposit could escape. The material was then heated gradually to a temperature of about 1700° F. to cause diffusion of the iron and stainless steel to take place and produce a diffusion weld, and then the temperature was raised to between about 2100° F. and 2200° F., after which the material was subjected to the usual rolling operations to produce a weld between the backing metal and the film and produce a plate of desired dimensions.

In assembling the backing sheets on the plated members the type of edge joint used at the time of welding is important, for after the first pass of the material through the rolls or substantial elongation, the backing metal will be welded to the stainless steel sheets through the intervening film, so that there is no chance that separation will take place here. However, the two surfaces of the stainless steel will not weld, as they were particularly separated by the layer of talc or asbestos, or other suitable separating material, and there is always a substantial danger of these sheets separating under the shearing action resulting from the pressure or draft of the various passes. For this reason a particular method of assembling these sheets or plates is desirable.

The method of assembling the elements for rolling which I have found most desirable consists in cutting the backing sheet or plates somewhat larger than the plated stainless steel sheets and inserting clean bars of iron, that is, free of apparent oxide or mill scale between the backing sheets and surrounding the edges, and welding them in place without necessarily making the weld continuous or non-porous. The occluded hydrogen of the electrolytic deposit will be driven out during the first heating, and during the first pass through the rolls the bars will weld top and bottom to the backing plates and hold the backing plates together during the subsequent rolling operations. When thin plates of stainless steel are used, the space between the edges of the backing sheets may be filled by welding instead of by edge bars.

The product made following the foregoing example showed a very close union and firm physical bond between the stainless steel face and the backing plate and on examination under the microscope it was found that an excellent diffusion weld had taken place between the electro-deposited iron and the stainless steel and a good weld to the backing sheet and that the iron members formed a substantially homogeneous layer.

Such a product is illustrated in Fig. 1 of the drawing which shows a photomicrograph of a section of the bond between a facing plate containing about 18% of chromium and 8% of nickel and a backing plate of mild steel (about .20% carbon) with iron used as the protective film. The magnification is 750 diameters.

In the upper part of the drawing is shown the stainless steel alloy; below this is a diffusion zone made up of solid solution crystals of the stainless steel alloy in iron. This is indicated by the small size of the crystals and the manner in which they resisted the etching acid. There is also evidenced some concentration of the diffusing elements along the grain boundaries. Below the diffusing zone the balance of the drawing shows the low carbon steel as indicated by the presence of pearlite.

At first sight it would appear that the diffusion zone is a separate band and that this indicates the thickness of the electrolytic iron deposit, but in fact this is not the case. Undoubtedly the carbon of the backing material has migrated up until it overlaps the alloying elements, but the carbon in the presence of chromium and nickel has not formed pearlite but is in solid solution and not apparent. The width of the diffusion band is primarily a function of the temperature at which the sample has been treated and the time at heat rather than the thickness of the electrolytic layer, and this diffusion band may be substantially wider than the thickness of the electrolytic deposit or if only very low temperatures of diffusion have been employed for a short time it may be substantially narrower than the thickness of an identical electrolytic layer. This indicates, as stated above, that the product is substantially a two-layer product with a diffusion zone uniting the layers and not a three-layer composition, for if it were possible to obtain a direct union of the carbon bearing steel and the stainless steel alloy and a diffusion of one into the other a photograph of the product would be directly similar to the one shown. In other words, the iron film is merely a means of forming the weld, and because of the cleanness of the joint the formation of the weld is accompanied by such a diffusion into and through this film, that its identity is entirely lost and the effect is that of an extraordinarily efficient direct combination of the facing material and the backing.

It is obvious that if desired the rolling may be conducted with a single sheet of the stainless steel having its electroplated film against the backing sheet, or where the ultimate product is to be veneered on both faces, two sheets of the electroplated stainless steel may be applied to a single sheet of backing material. In any case the various sheets should be welded together leaving vents for the escape of hydrogen. In such case where the stainless steel is exposed it should be protected against scaling during the heating operation, as by putting it down on the hearth of the furnace or by covering the material with ashes and not using a strongly oxidizing furnace atmosphere. Where the surface of the corrosion resistant metal is later to be ground, the iron plating may be done on both sides of a single sheet. In such case the exposed iron face will protect the surface of the alloy during heating and rolling and if there is any residue it may be removed by grinding or pickling.

*Example 2.*—Two slabs of standard alloy containing 18% chromium and 8% nickel were prepared and plated as in Example 1. The backing metal selected was an alloy steel containing 3.5% nickel which is known to be difficult to weld. Accordingly, slabs of backing metal are pickled in hydrochloric acid and plated with iron, following the procedure stated above, except that the slabs were not assembled back to back, as it was found to be more economical to plate both sides of these slabs than to go to the expense of combining them as had been done with the stainless steel. The backing slabs were then assembled with the plated stainless steel inserts so that the electroplated surfaces were in contact and the members were seam welded as described above, after which they were heated and rolled as before.

*Example 3.*—Assemblies of stainless steel prepared as in Example 1 made up of slabs measuring 18" wide x 1¼" thick x 3' long were heated to a temperature of between 1700° and 1800° F. for about 1 hour. This drove off occluded hydrogen and produced a good diffusion weld between the iron film and the stainless steel. Following this, the slabs, sand blasted and cleaned of scale, were placed as inserts in an ingot mold so proportioned that the sides of the ingot mold were about 5½" away from the insert. The inserts were stood upon the suports so as to allow the metal to flow under them and the inserts were so positioned in the ingot mold that a space was left entirely around the edges and the mold walls were high enough to come substantially above the inserts. Molten metal was then poured into the mold, preferably being poured in at both sides of the inserts at once, using for this purpose a tun dish.

Due to the fact that a diffusion weld had taken place between the iron and the stainless steel there was no tendency for the iron to peel off as the molten metal rose in the ingot mold and an excellent fusion bond or weld was obtained between the cast backing and the insert. In this connection it may be noted that the diffusion weld between the alloy and the electrolytically deposited metal may promote a good bond by assisting in dissolving or softening the surface of the stainless steel, for as the dissolving action will start on the pure iron surface which will dissolve quite rapidly, and as this dissolving action spreads it will act on metal which becomes gradually richer in alloys and they in turn will act more efficiently on the yet richer material beyond them than would the pure iron. Such a condition is conducive to producing an excellent fusion. After rolling the product closely resembled that shown and described in connection with Fig. 1.

As stated above, it is understood that where the backing metal is high in carbon, it may be advantageous to use a plated layer of nickel directly on the stainless steel, over which is applied a relatively thick layer of electroplated iron. In such case the iron layer is preferably thick enough so that it will not all fuse away when the backing metal is cast against it for it is desirable to maintain an unbroken layer of nickel. This will effectually prevent migration of carbon during subsequent hot rolling.

When casting iron against stainless steel, usually a relatively heavy tightly adhering oxide layer is formed on the face of the stainless steel; this occurs primarily in advance of the rising line of molten metal resulting from the heating of the stainless steel both by transfer of heat through its body and by the enormous amount of heat radiated from the adjacent molten metal. Further, this formation of oxide coating will be accentuated in local spots due to the inevitable splashing effect. In my case these difficulties are all overcome, for the protective layer of metal will act to cover the portion of the stainless steel that is above the molten iron and even at the rising line of the molten iron this protection will continue, for the thin electrolytic iron layer will not fuse entirely until it has been definitely submerged, and the splashes can only adhere to the layer and do no damage, being readily dissolved off. Even in the case where the electrolytic iron layer is so thin that it is entirely melted into the body of molten metal there will be a true fusion weld formed between the backing iron and the inserts.

After the ingot is poured, it is reheated for rolling, say to 2100° to 2200° F. and rolled to billet shape; the top is then cut off but the insert plates are not exposed. The ingot should not be rolled with great pressure on the sides that contain the edges of the inserts as there is danger that the ingot will squeeze down and break in two halves. If sheets or plates are to be produced, the billet is cross-rolled to give the necessary width for a flat billet and then allowed to cool for surface inspection and preparation. The flat billet is then reheated and rolled to finished dimensions, trimmed on its long edges and separated to produce two plates or sheets of the desired thickness.

*Example 4.*—Instead of using hydrochloric acid of the strength set forth in Example 1, which is approximately a 12 normal solution, a much weaker solution may be used; for example, an acid as weak as a 3 normal solution may be employed, though we find it better practice to use an acid at least as strong as a 6 normal solution. In any of these cases it is desirable to make the metal pickled anodic, using a current density of about 60 amperes or more per square foot of surface. An illustration of this is as follows:

Two slabs were prepared each 22 inches wide, 1 inch thick and 60 inches long. One of the slabs was a high carbon chromium steel of an analysis approximately: carbon 2.0%, chromium 12%, vanadium 1%—balance principally iron; the other slab was rustless iron of an analysis approximately: carbon .10%, chromium 16%—the balance principally iron. These two slabs were each sand blasted to remove mill scale and were then placed in an acid pickling bath consisting of a 6 normal hydrochloric acid solution at room temperature. The plates were connected as anodes, the cathodes being graphite. The current density was about 60 amperes per square foot of surface with the voltage at the generator 6 volts. Under these conditions the slabs were pickled electrolytically for 10 minutes, then removed and scrubbed and washed with water and returned to the pickling bath and made anodic again for one minute and were then carried over to the iron plating bath with the hydrochloric acid solution covering the surface of the slabs. The plating bath used was similar to that described in Example 1, and the current density was 60 amperes per sq. foot, with the voltage at the generator being about 6 volts, but of course for plating the slabs were cathodic.

This plating was continued for about 2 hours and after the plating was completed the slabs were removed and washed in hot water so that they dried rapidly. Two backing plates were prepared which were of the same area as the slabs but were respectively 2 inches and 4 inches thick. These backing plates were freshly pickled and clean and dry. The slab of high carbon chromium steel was then assembled with the 2 inch backing plate and the rustless iron slab was assembled with the 4 inch backing plate. The edges where the slabs joined the backing plates were seam welded with an electric arc and afterward the assembled slabs were heated to 1750° F., soaked at this temperature for 1 hour, then raised to 2000° F. and rolled. The high carbon chromium steel assembly was rolled down to a plate 1 inch thick, whereas, the other sample was rolled to a plate ⅜-inch thick. In each case the welds were perfect and showed no oxide or any other matter interfering with the weld in the weld zone. The high carbon chromium steel clad plate was cut up and used as a die steel for use in punch press work and the rustless iron clad plate was used in tank construction. The electrolytic iron covering the exposed surfaces of the alloy steels was removed as scale during the hot working.

*Example 5.*—When preparing steels containing tungsten, such as high speed steels, better results can be obtained if the steel is first given an anodic pickle in an alkali solution (which may be at atmospheric temperature) and then as a final step is given a very short immersion in hydrochloric acid which may, for example, be of a strength of between 6 and 12 normal. It is then carried over to the plating bath covered with such acid. An example of an alkali bath which is efficient for this purpose is one which contains approximately 115 grams of sodium hydroxide and 15 grams of citric acid per liter, the balance being water. An illustration of the use of such a bath is as follows:

A bar of high speed steel of an analysis substantially as follows: carbon 0.65, tungsten 18.5%, chromium 3.85%, vanadium 1.75%—the balance being principally iron, and measuring 6 inches wide, 1 inch thick and 5 feet long, was inserted in an alkaline bath such as has been described, without preliminary surface descaling, and was connected as the anode using ordinary iron cathodes. The electrolysis took place at room temperature with a current density of about 25 amperes per square foot though a higher density might have been used. The voltage was 6 volts at the generator. After about a minute bubbles appeared on the surface and the scale was shed off the high speed steel, the action seeming to be very uniform. When the high speed steel appeared to be free of surface scale it was removed from the bath and scrubbed and rinsed with water. Its surface had then an appearance of being covered with a thin but dirty looking material which was not readily brushed off. The steel of this appearance was now immersed in hydrochloric acid of about 6 normal strength (about 18%). The dirty looking material immediately disappeared and in a few seconds the steel had a very clean, bright surface which was now carried over to the plating bath as in the other examples. The electrodeposited iron adhered firmly, as there was no intervening non-metallic film which would otherwise have prevented the type of adhesion which is capable of producing diffusion at elevated temperature. The length of time in the anodic alkali pickle is not critical for similar results have been found on times ranging from 3 minutes to 8 hours.

After the plating had continued for about 2 hours, the bar of high speed steel was washed as before and then had welded on each face a bar of an analysis: .25 carbon, 3.5 nickel, balance iron, which had previously been plated as in Example 2. These bars were the same width and length as the high speed steel but each was about 3 inches thick. The whole assembly was then rolled down to a ¾-inch round bar and was twisted to suit the convolutions of a twist drill and then milled out in the nickel steel portion. The milled drill was then treated in the usual way customary for high speed drills and gave an excellent product having the center and cutting portions high speed steel which was supported by the nickel steel.

*Example 6.*—In this case the high melting point metal was an alloy known as "stellite" having an approximate analysis of cobalt 55%, chromium 30% and tungsten 15%. This alloy has heretofore been considered substantially non-weldable. A bar of this alloy was ground square to dimensions of 4 inches by 1 inch by 1 inch. It was first given an anodic treatment in a 12 normal hydrochloric acid bath (approximately 37% HCl) with a current density of 6 amperes per square foot, using 6 volts at the generator. This treatment was continued until the piece was covered with a dark blue material which would not scrub off. The acid was washed off carefully in water and then the piece was treated anodically in an alkaline bath similar to that described in Example 5. This treatment was continued until bubbles arose from all parts of the surface. The piece was then washed and placed for a few seconds in a 12 normal hydrochloric acid solution without the use of electric current and then while still covered with the acid was transferred to the chloride plating bath. Iron was plated onto the surface for about 6 hours giving a layer about .018 inch thick. As customary, the piece was then washed and dried. The backing material used was low carbon steel having a face freshly ground. One of the plated faces of the stellite was clamped against the backing material and the two were seam welded around the contacting edges to prevent ingress of furnace gases. The assembly was then heated for about one hour at 1900° F. and the two parts were pressed together sufficiently to deform the backing. An examination of the material at this stage indicated that the two were firmly welded together. However, to improve the quality of the weld, the assembly was annealed at about 1750° F., previous to being used in the production of a lathe tool. The bond between the stellite and the backing material was very tight and showed no signs whatsoever of separating but indicated that an excellent diffusion weld existed.

In addition to the use of my process for the manufacture of sheets, plates and bars, it may also be used for making bodies of other shapes; for example, tubes may be made of stainless steel plated on the inside according to the procedure as illustrated above and then a bar of steel may be inserted and the whole worked to finished dimensions so as to cause a weld to take place between the steel bar and the inside surface of the shell. In such case it may be advantageous to electroplate the surface of the insert bar with iron to assist in the formation of the weld. Products made by this method are excellently adapted for various purposes such as automobile bumpers, turbine blades, piston rods and shafting of various types. Also a modified form of this application of my invention is applicable for use in valves for internal combustion engines.

Valves for internal combustion engines, particularly where they are to operate in an atmosphere containing the combustion products of tetraethyl lead are subject to great corrosive action which is both chemical and a function of temperature. There are well-known so-called heat resisting steels and alloys which are excellently adapted to meet this condition, but they are expensive and generally have physical characteristics which renders them unsuited to valve conditions. According to my present invention I can take any of these well-known alloys that are capable of being hot forged and veneer them to a core having the necessary physical properties under valve conditions and temperatures. By this means a product is obtained the surface of which will resist corrosion and with a core that will supply the necessary strength and at the same time the union between the two parts will be adequate to give necessary heat transfer. Such composite members have not previously been available, for the alloys having the proper heat resistance all form dense protective films and this film coating prevents forge welding or welding where molten metal is cast inside the tube and allowed to solidify against the surface.

My method of removing the oxide and directly protecting the surface of the corrosion resistant metal with a forge weldable metal solves this problem. For example, I may select a well-known alloy having great heat resistance comprising essentially 80% nickel and 20% chromium and form a tube of this either by casting, welding or drawing as is now known. This tube is then pickled in hydrochloric acid to remove the surface film and brought to the plating bath as in Example 1. The inside is then electroplated with iron giving it a depth of coating of about .012" thick; the thickness of this coating is not of vital importance. A bar is then prepared adapted to fit into the tube. Such bar can be made of a steel having high physical qualities such for example as a high tungsten valve steel which may have an analysis of: tungsten 9%–12%, chromium 3–3.5%, carbon about .65%, balance iron. This bar may be first plated with nickel and then given an electroplating with iron all as specified above and then inserted in the tube. The ends of the tube are welded to prevent ingress of furnace gases but leaving a small blow vent for escape of hydrogen, and the whole is heated to about 2100° F., being first soaked for about an hour at a temperature of between 1700° F. to 1900° F. to promote diffusion. The tube is then mechanically worked down to finished dimensions with one or more heatings. If preferred a simple low alloy steel may be used as the core, instead of the tungsten steel described.

The composite bar produced by this process will show an oxide-free weld between all the films and surfaces. While it is advisable to have the internal bar electroplated before being inserted, the necessity of this will depend somewhat on the analysis used, for if a readily weldable composition is employed, the electroplating will not be necessary but in any event, the important factor is that the internal surfaces of the tube of non-corrosive metal must be protected as otherwise no satisfactory weld will result. If desired, the separate elements may be given a diffusion treatment after plating but before assembly.

The dimensions of the tube may be varied to suit the conditions but should be adapted for ready insertion in the acid bath and plating bath in which it is advantageously suspended vertically in order to permit the use of a centrally suspended anode. For this reason the tube may be fairly short; for example, I may employ a tube having a 4" bore with a side wall ¼" thick, the tube being about 3' long. If pickling and plating facilities permit, a longer tube may be advantageous.

In another example, a cast tube of an analysis containing chromium 25%, nickel 18%, aluminum 1.5% and silicon .75% was made about 3 ft. long with a 6" bore and a side wall ½" thick, but this tube was made square with approximately flat (slightly convex) sides and well rounded corners. After being thoroughly annealed the internal surface was electroplated with iron which was built up to give a fairly thick coating approximately .018" thick and the tube was then given a treatment at about 1800° F. for an hour to produce a diffusion weld so that the surfaces of the alloy and iron would be held together. The tube was then pickled internally with a 20% sulphuric acid to remove the scale and then with hydrochloric acid to remove the oxide and afterwards washed and dried. It was then placed inside an ingot mold which substantially fitted the outside of the tube but extended up beyond the top of the tube so that the contraction sink pipe formed on cooling would not reach down into the tube. Molten high speed steel was then poured in the mold so that the tube was entirely filled. This fused the electrolytic iron layer and produced an excellent fusion weld. On cooling the tube contracted on its flat faces allowing for the shrinkage of the molten metal so that the elements did not pull apart. The ingot while still hot was charged in the furnace and after being brought to the proper temperature was rolled to desired dimensions.

Figure 2:
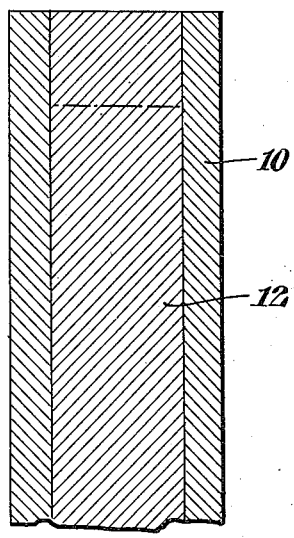

The procedures outlined above produced rods having cores of desirable physical characteristics and surfaces excellently adapted to resist high temperature corrosion, as shown in Fig. 2 which represents a sectional view of a portion of such a bar.

In Fig. 2 the numeral 10 designates the outside shell which is preferably of a heat-resisting alloy such as has been described, while 12 is the core made of steel having proper physical characteristics. These two are united by a diffusion zone but such zone is only microscopic and does not show in this figure.

The particular embodiment of my invention in the form of valves for internal combustion engines, or in the form of rods or bars particularly intended for making such valves, is not specifically claimed in this application, for such embodiments are claimed in my co-pending application Ser. No. 1834, filed Jan. 15, 1935.

A further illustration of the use of my process is in the case where two bodies of alloy steel are to be united together, as for example, in the manufacture of shear blades. For such case, I may use two slabs of high speed steel measuring 6" wide by 1" thick x 6 ft. long; such steel may for example have an analysis of carbon .70%, tungsten 18%, chromium 4%, vanadium 1%, the balance being substantially all iron.

These plates are electroplated separately following the procedure of Example 5 and for this purpose a thin layer of iron is sufficient, about .012" serving for this purpose. These plates are then assembled with a layer of separating material between them, and outside of these two plates are positioned two slabs of backing material. The backing material is for example made up of a ferrous alloy containing 3½% nickel and .30% carbon. These slabs are slightly wider and longer than the high speed steel and are about 2" thick. The slabs are electroplated individually with a thin film of iron following the procedure of Example 1 or Example 4. After clamping the elements together, filler bars are interposed around the high speed steel plates between the backing plates and welded in place. The assembly thus made is heated to about 2100° F. (preferably being held at a temperature above 1700° F. for an hour) and passed through rolls, and hot worked to the desired thickness and then cut to dimension.

The final shaping and rolling may be conducted on the separated elements rather than on the composite assembly and in this case there will be little or no loss from scaling of either the high speed steel facing nor the nickel steel back as each will be covered by a layer of electrolytic iron, though the intermediate film will have merged and lost its identity. After the final dimensions have been attained, the faces can be ground to expose the alloy steels from which the article is made. Such grinding may either be taken as a separate step or as an incident to shaping the finished parts into sheer blades.

It is obvious from my general discussion above that the alloy face might be electroplated with an intervening film of another metal before the deposition of one or both coatings of iron, as this would tend to stop the migration of carbon. Also one of the members such as the high speed steel member might have been formed and coated as described, and then the steel backing might have been cast against it. In all of these examples it will be seen that one member to be welded has been formed with an electrodeposited facing so intimately united to such member and so free of intervening oxide or non-metallic weld preventing film that a real mechanical bond exists between the two, and thereafter the weld is made either by casting against or pressure welding to such coated face; and the desired result is obtained if the metal used for such facing is one which will merge with both members either by solid solution or otherwise.

I recognize that it has been customary in the past to instruct those who are preparing high melting point metals such as ferrous metal alloys for electroplating, to remove the scale or oxide. The oxide so referred to is the usual rust or scale resulting from exposure to moisture or to high temperatures. A method generally used for removing such oxide coating is by a treatment with sulphuric acid, reliance having been placed either on the chemical action of the acid alone, or in other instances it was accelerated by an electrolytic process. These treatments will remove a heavy oxide coating such as has been referred to, but to the best of my knowledge, as now practiced they invariably result in the formation on the surface of a high melting point metal of the type which is hard to weld and to which this invention applies of a thin film which probably is an oxide and which decidedly interferes with welding. Accordingly, the usual sulphuric acid treatment which has been frequently suggested and used is not to be considered as an equivalent of the hydrochloric acid treatment which has been described above though other sulphuric acid processes which give the desired result may be discovered.

It is not to be understood from these statements that this invention is intended to be restricted to the use of the specific methods of preparing the metals or of plating which have been described in the examples, as these specific processes form no part of the present invention but are being claimed in other co-pending applications, and it is a reasonable expectation that other methods may be found whereby the electrolytic iron may be deposited on the surface of the high melting point metal base without the interposition of a non-metallic film. Thus largely equivalent results can be obtained by treating the metal in a fused chloride bath which is also used as a plating bath. Also it is possible to use hydrofluoric acid to clean up the metal. No examples are given of these processes as they both involve serious commercial drawbacks. It is further to be understood that other modifications may be made without departing from the spirit of my invention.

What I claim is:

1. The method of making composite metal articles composed of a facing metal consisting of a chromium containing ferrous alloy and a ferrous backing metal of different characteristics, which comprises the steps of treating a mass of such a chromium containing alloy to produce a metallic surface substantially free from film forming ingredients of a type tending to interfere with welding, depositing electrolytically on such a surface, while substantially free from such films, a closely adhering layer of iron and thereafter welding such iron coated surface to a backing of ferrous metal by the action of heat and pressure.

2. The method of forming composite metal articles which comprises the steps of treating to remove oxide therefrom a surface of a body of high melting point metal of a type adapted rapidly to form an oxide film in the atmospher and comprising a dominating proportion of metal selected from the group consisting of iron and nickel, electrolytically depositing on such surface while substantially oxide free, a bonding layer comprising a dominating percentage of iron on its outer surface, causing such layer to diffuse with the body of high melting point metal and uniting a ferrous body to such layer coated surface under conditions adapted to produce a weld.

3. A method as specified in claim 2, in which such layer is caused to diffuse with the metal body as an incident to uniting additional ferrous metal to said layer coated surface by heat and pressure welding.

4. A method as specified in claim 2 in which such additional ferrous metal is caused to unite to said layer coated surface as an incident to casting.

5. The method of welding high melting point metals which comprises cleaning the surface of a body of such a metal to remove therefrom films of a type tending to interfere with welding, building up over such surface while substantially free from such a film, a layer of electrolytically deposited iron adapted to bond with such body of metal, causing such layer of iron to diffuse with the body of metal and uniting to such layer coated surface a ferrous body under conditions adapted to produce a weld.

6. The method as specified in claim 5, which further includes the step of electrolytically depositing a layer of copper underneath the layer of iron.

7. The method of forming composite metal bodies which comprises forming on the surface of a body of corrosion-resistant metal comprising a metal selected from the group of chromium and nickel, an electro-deposited, closely adhering protective layer having an iron face, and thereafter uniting to such face additional iron at a temperature at least equal to the welding temperature.

8. The method as specified in claim 7, in which the protective layer is formed by first depositing electrolytically a film of metal selected from the group comprising silver, copper, nickel and cobalt on which is deposited a film of iron.

9. A process as specified in claim 7, in which the additional iron comprises a facing of electrolytically deposited iron.

10. The method of welding ferrous bodies which comprises forming on the surface of a body of ferrous metal an electro-deposited, closely adherent protective layer of iron and thereafter welding additional ferrous metal to such face by heat and pressure.

11. The method of uniting two not readily mutually weldable ferrous bodies which comprises cleaning a face of each such body to remove oxide, electro-depositing over each such face, while substantially oxide-free, a strongly adhering layer of iron and thereafter welding together such iron layers by heat and pressure.

12. The method of forming composite metal bodies, which comprises forming on the surface of a foundation body of metal consisting largely of a metal selected from the group consisting of iron and nickel, an electro-deposited adhering layer of iron, placing another body of ferrous metal adjacent such electro-deposited iron, substantially sealing the contacting edges of such bodies, heating to a temperature of at least about 1700° F. and thereafter subjecting the composite mass to rolling.

13. A method as specified in claim 12, in which the foundation body of metal is an alloy of iron and chromium.

14. A composite metal mass comprising a portion consisting of a not readily weldable ferrous alloy, an oxide-free diffusion zone adjacent thereto comprising a solid solution of metal of such first portion in electrolytic iron deposited in situ and additional iron merging into such electrolytic iron and united thereto by welding.

15. A composite metal metal mass comprising a facing of corrosion-resistant metal, electrolytic iron deposited thereon and diffused therewith substantially without intervening oxide and a backing of ferrous metal welded thereto.

16. A composite metallic mass comprising a mass of high carbon alloy steel, a diffusion zone adjacent and united thereto substantially without intervening oxide consisting of a diffusion of such steel with electrolytic iron and additional ferrous material united thereto by welding.

17. A member comprising a portion of high speed steel and a second portion of steel of different physical characteristics, said two portions being welded together with an intervening diffusion zone consisting of a substantially oxide free diffusion of the high speed steel with electrolytic iron, which zone merges into said other steel.

PERCY A. E. ARMSTRONG.